United States Patent [19]
Olschewski et al.

[11] Patent Number: 4,776,707
[45] Date of Patent: Oct. 11, 1988

[54] LINEAR ROLLING BEARING ELEMENT

[75] Inventors: Armin Olschewski, Schweinfurt; Berthold Beyfuss, Kaisten; Hermann Hetterich, Heidenfeld; Klaus Muschiol, Schweinfurt; Ingo Laufer, Theres-Buch; Peter Horling, Mainberg, all of Fed. Rep. of Germany

[73] Assignee: SKF GmbH, Schweinfurt, Fed. Rep. of Germany

[21] Appl. No.: 942,544

[22] Filed: Dec. 16, 1986

[30] Foreign Application Priority Data

Dec. 19, 1985 [DE] Fed. Rep. of Germany ....... 3544919

[51] Int. Cl.$^4$ ............................................. F16C 29/04
[52] U.S. Cl. ...................................... 384/51; 384/54
[58] Field of Search ..................... 384/51, 54, 56, 57, 384/19

[56] References Cited

U.S. PATENT DOCUMENTS

| | | | |
|---|---|---|---|
| 2,651,552 | 9/1953 | Pitner | 384/51 |
| 3,927,919 | 12/1975 | Bunzli | 384/51 |
| 4,262,974 | 4/1981 | Tojo et al. | 384/54 |

FOREIGN PATENT DOCUMENTS 3440105 5/1985 Fed. Rep. of Germany .

Primary Examiner—Lenard A. Footland
Attorney, Agent, or Firm—Rosen, Dainow & Jacobs

[57] ABSTRACT

In a linear rolling bearing element, especially for tripod joints, the cage is formed of a relatively thick sheet metal and limit projections for a linearly movable support are formed by stamping out of the material of the cage. The rollers are likewise held in the cage by projections formed out of the cage. This results in a stable cage which can take the high forces from the engagement of the support. The outer roller may be close to the limit projection, in order to assure a good support of the roller in the extreme position of the tripod joint.

6 Claims, 3 Drawing Sheets

LINEAR ROLLING BEARING ELEMENT

This invention relates to a linear rolling bearing element, wherein a plurality of rolling elements are mounted in a cage, the rolling elements being adapted to roll on a flat roll surface, and wherein the cage has a limit projection for a support element supported by the bearing element.

In a linear rolling bearing element described in DE-OS No. 3,440,105, the pins of a tripod joint are partially ball shaped and translate the turning moment to the driven element by way of a linear rolling bearing element. Due to the swivelable movement of the pin it is necessary in this arrangement to provide a sliding bearing support. The upper side of the bearing support has a flat race for a set of adjacent rollers, which in turn roll linearly on a flat roll race of the driven element. A cage holds the set of rollers and has a limit projection on one end, the projection being adapted to engage the support of the extreme tipping position of the tripod joint. This known arrangement has a cage of a relatively thin sheet metal, the cage ends being bent at right angles for the formation of the limit projections. Upon the engagement of the support with the end of the limit projections, the cage ends coupled thereto are subject to strong tension and bending forces since the cage is connected in the movement direction due to the firmly clamped rollers between the support and roll race of the driven element. As a result the unavoidably weakened position of the cage, namely the transitions of the cage end in the side section and in the corner sections of the cage pockets, are strongly stressed. This results in the formation of notch cracks extending out from the corners of the cage, leading to the eventual complete separation of the cage ends. Furthermore, this region is stressed by bending forces which likewise result from the engagement of the support on the limit projections, since the outer roller as well as all of the others are held in the cage by the projections. These bending stresses are greater as the distance from the outer roller to the respective limit projection is increased. A more suitable approach is, however, not possible because, by attaining the desired rounded bending zone of the limit projection, for appropriately guiding the roller, a formation of the holding projection of the roller is no longer possible. Since avoiding this disadvantage requires the use of thickened sheet metal material, the bending radius for the limit projections and the necessary distance from the outer roller is increased.

The object of this invention is to so improve the linear rolling bearing elements of the above type that the forces acting on the limit projections do not result in the production of premature damage of the whole cage.

In accordance with the invention this object is achieved by forming the cage from a flat sheet metal strip with a relatively great thickness, and forming the limit projections by stamping out the material of the cage.

This arrangement has different advantageous effects on the stability and production of the rolling bearing. Due to the use of a relatively thick sheet metal for the cage, regions subject to failure have increased strength and form stable transitions, which also can withstand greater tension and bending forces.

Furthermore, an accurately formed edge region between the limit projections and the cage outer surface is produced by the stamping out of the limit projections, which more clearly defines the edges of the limit projections. This gives rise to the possibility that the last roller can be very close to the limit projections in order to thereby reduce bending in the corner sections of the roller pockets due to the outgoing force. This possibility has moreover the advantage that in the extreme position of the tripod joint the complete number of rollers between the support and the driven element for the translation of turning moments is operative and the tipping of the support as a result of deficient roller under support is avoided. The stamping out of the limit projections can be effected, for exampee, by stamping with a conventional work tool, whereby a material section corresponding to the form of the limit projection is partially pressed out in the direction of the thickness of the cage material. A further possibility is that the facing side of the work tool is rounded in the direction of the cage width, whereby an arcuate limit projection formed out of the material of the cage is produced. This has the advantage of a more intimate connection to the stamped out position of the cage material and can be thereby further stamped out at the center of the work position. Furthermore, it is possible to provide a work tool that effects stamping and, at the same time, flow forming of the projections. Thereby a greater material volume on the backside of the cage can be used for the formation of limit projections of smaller cross section projecting farther out on the other side of the cage.

These features, in accordance with the invention, achieve the object in an exemplary manner and produce a generally more easily producable cage that is stable in operation and fully operational over its entire life.

According to a further feature of the invention the roll pockets on one side of the cage are formed to fit the surface shapes of the rollers and are provided with holding projections formed out of the material of the cage on the other side for holding the rollers. The use of a relatively thick material permits the preforming of the cage pockets with projecting regions of roller contour on one side of the cage. Thereby the holding projections prevent the rollers from falling out in one of the two directions. This side is advantageously the side on which the limit projections are also arranged, so that no complicated work tools are required for the production of the holding projections for the rollers. This provides the special advantage that the last roller, next adjacent the respective limit projection, now can be brought up very close to the limit projection. After the insertion of the roller, holding projections are formed out of the material of the cage on the back side of the cage from the edge regions of the roller pockets, i.e. from the webs, these holding projections abutting the surfaces of the rollers and thereby preventing the falling out of the rollers in the other direction. In a further embodiment of the invention the rollers have reduced diameter pins on their ends, which are inserted in corresponding recesses in the side sections of the cage and held therein by projections formed out of the material of the cage. These rollers permit, in a known manner, the accurate guiding and holding on their pins, whereby the cage has no webs and can have an increased number of rollers. In the side sections of the cage corresponding recesses are provided which permit the insertion of the rollers in the direction of their radii. Then the recesses are stamped, i.e. the holding projections are formed.

In accordance with a still further feature of the invention sliding projections are provided under the side of the cage away from the support, lying on the roller race. The sliding projections support the cage on the roller race so that extreme forces, extending out from the forces acting on the limit projections, need not be completely supported by the holding projections for the rollers. When these sliding projections are formed somewhat in the edge section of the cage in the region at the lower end of the limit projections, the transmission of force to the sensitive zones of the cage can be greatly reduced. In this case, however, additional friction forces due to the sliding projections must be calculated.

In accordance with a still further feature of the invention the limit projections are provided with slits for receiving and holding these springs by stamping, whereby both sides of the support in each case have a right angle cross section, so that their ends can be arranged in the roll springs fastened in the respective limit projections. The relatively massive limit projections produced by the stamping out of the cage material are adapted for such fastening of the springs. Slits having shapes corresponding to the cross sections of the springs are thereby stamped in the projections during their formation. After the insertion of the springs they are form closed to firmly hold the springs by the stamping of the material. A roll spring which has a constant stiffness over the whole spring deflection has been shown to be especially advantageous for this purpose. Such a roll spring must be provided on both sides of the cage, between which the support is tensioned.

The unintended falling out of the support can be hindered by the provision of a safety device anchored in the holding projection. This can be engaged in a groove machined in the support and be a flexible spring wire which guarantees a free movability of the support along its movement path. This arrangement provides a further guiding possibility in corresponding embodiments of the invention, with the aid of a flange.

In order that the invention may be more clearly understood, it will now be disclosed in greater detail with reference to the accompanying drawings, wherein.

Figure 1:
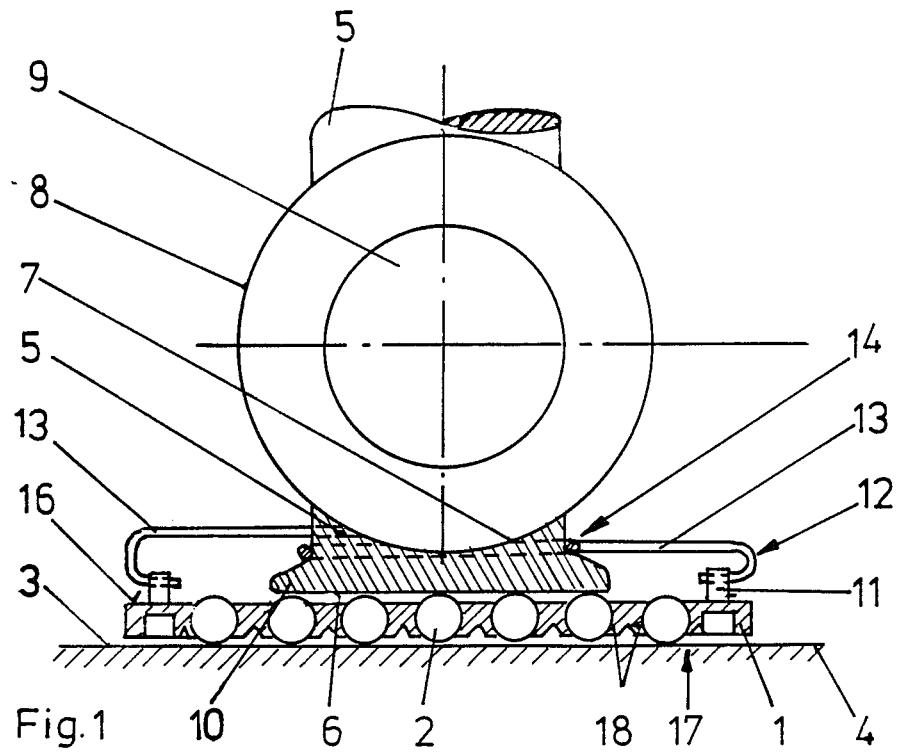
FIG. 1 is a longitudinal cross-section of a linear rolling bearing element for a tripod joint taken along the line A—A of FIG. 2.
Figure 2:
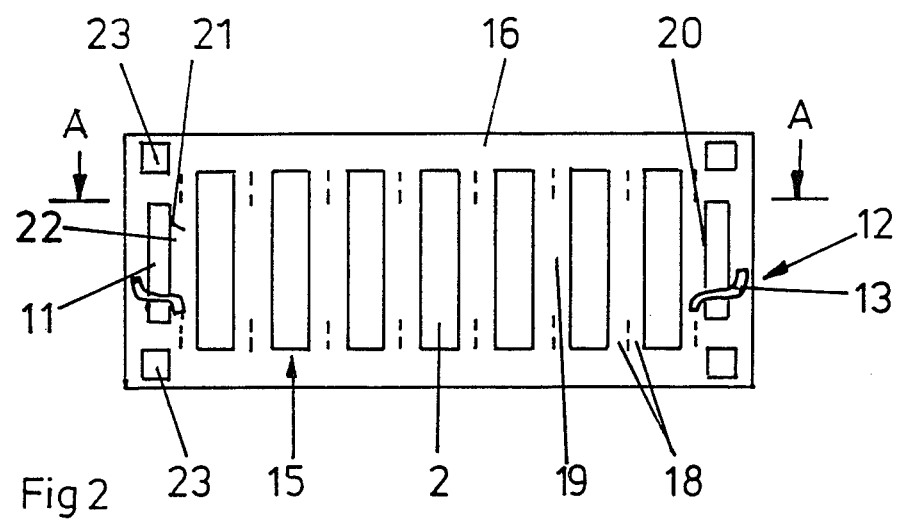
FIG. 2 is a plan view of the cage of the rolling bearing element illustrated in FIG. 1.
Figure 3:
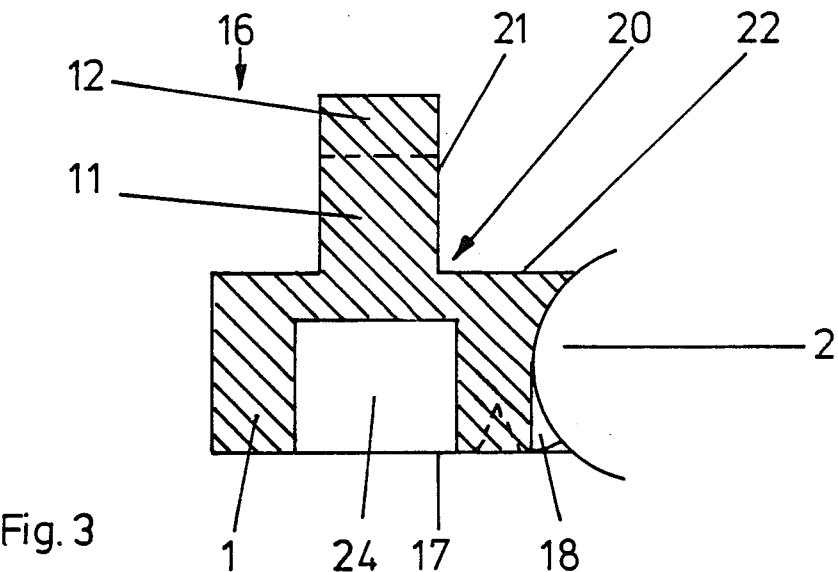
FIG. 3 is an enlarged cross-sectional view of a portion of the cage of FIG. 1, in longitudinal section.

The linear rolling bearing element for a tripod joint illustrated in FIG. 1 is comprised of a cage 1 having a set of rollers 2, which are linearly displaceable on the roll race 3 of a driven body 4, and a support 5 with a planar race 6 on its end, for the rollers 2. The support 5 further has a spherical shaped sliding surface 7 which is freely movable on the ball shaped outer surface 8 of a driving pin 9. The tripod joint has three of these drive pins 9 distributed about the circumference of a drive shaft (not illustrated) each of which is provided with two linear rolling bearing elements opposite to one another in the circumferential direction. During driving movements a turning moment is translated to the driven body 4 from the drive pin by way of the support 5 and the rollers 2. The rolling bearing elements permit a linked interconnection between the drive shaft and the driven body 4, whereby the support 5 is linearly moved in a plane, describing a partial circular course depending, however, upon the distance from the turning axis of the drive shaft. The roller sets 2 and the cage 1 move purely linearly. After a distance determined by the rolling characteristics of the bearing, the support 5 engages one of the limit projections 11 of the cage 1 with its flange 10. The limit projections are formed out of the material of the relatively thick sheet metal of the cage 1 by stamping, and extend with right angle cross sections for the width of the cage 1, as is apparent in FIG. 2. As illustrated in FIGS. 1 and 3, the thickness of the sheet metal of the cage is greater than half the diameter of the rollers 2. The limit projections 11 have slits 12 extending in the longitudinal direction of the cage, and the ends of spring 13 are inserted in these slits and peened in place. The spring 13 winds about a support 5 with a turn 14 and centrally aligns the cage 1 and the support 5 as necessary.

In the production of the cage 1 the rollers 2 are formed in corresponding roll pockets 15 which narrow with corresponding curvature in the direction toward the support 5, in the arrangement of FIG. 1 toward the upper side 16 of the cage 1. As a consequence the rollers 2 cannot fall out of the roller pockets 15 in this direction. After the insertion of the rollers 2, holding projections 18 are formed out of the material of the webs 19 in the region of the ends of the rollers on the side of the cage toward the race 3, in the arrangement of FIG. 1 on the underside 17 of the cage. As a consequence the rollers 2 cannot fall out of the roller pockets in this other direction. Sliding projections 23 are formed out of the material of the cage 1 in the end section by a stamping process, which brace or guide the cage 1 on the roller race 3. They lie outside of the true roll surface for the rollers 2.

FIG. 3 illustrates an enlarged section of a portion of the end of the cage of FIG. 1. The limit projections 11, which are shown in FIG. 3 in a right angle section, are produced by a stamping process, whereby the material of the projections is pressed out of a somewhat wider and longer, however not so high, volume section 24, by flow forming from the underside 17 of the cage. The material thereby distributes itself in the same volume providing limit projections 24 of greater height than the section 24, providing also at this position a sufficient support surface 22 for the anvil of a stamping tool (not shown). As clearly seen in FIG. 3, the distance between the side 21 of the projection 11 and the next adjacent roller 2 is less than half the diameter of the roller 2.

Figure 4:
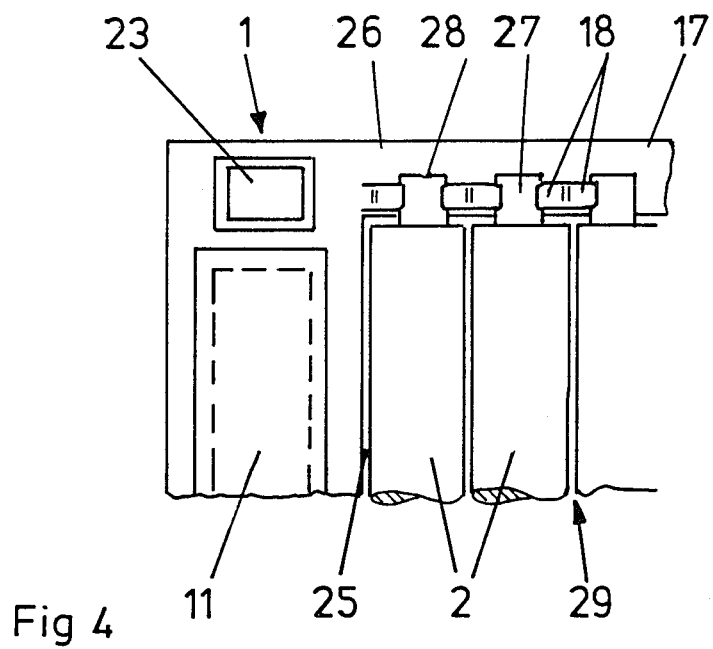
FIG. 4 is an enlarged plan view of a cage in accordance with the invention for use with rollers having pin end guides.

The cage illustrated in FIG. 4 is arranged for receiving rollers 2 of the type having guide pins at their ends and therefore has a single pocket 25 for receiving all of the rollers 2 without intermediate webs. The side sections 26 are provided with recesses 28 for receiving the pins 27 of the rollers, the recesses being open on the underside 17, i.e. the side toward the roller races, of the cage 1. After the insertion of the rollers 2 holding projections 18 are formed out of material on the side section 26 on both sides of the pins 27. The rollers 2 are arranged next to one another with minimum gaps therebetween, the mounting ensuring that the rollers do not fall out of the cage, thereby providing the advantage of a full roller arrangement with especially high carrying capacity. In this arrangement also the limit projections 11 and sliding projections 23 are formed out of the material of the cage.

Figure 5:
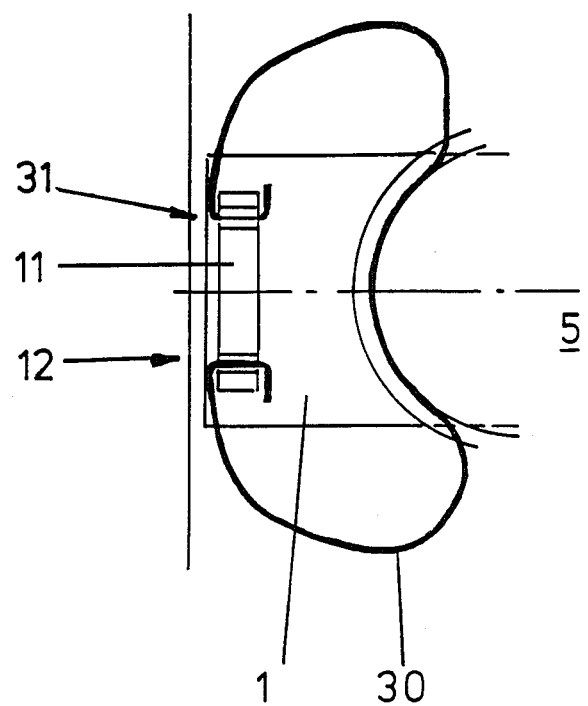
FIG. 5 is a plan view of the end of a cage employing a roll spring.

In the embodiment of the invention illustrated in FIG. 5, a roll spring 30 is arranged at each side of the support 5, the ends of a roll spring 30 being arranged in the slits 12 of the limit projections 11, being therein anchored in a form locking manner by peening 31.

In this description only the essential and thereby necessary characteristics of the invention have been shown.

While the invention has been disclosed and described with reference to a limited number of embodiments, it will be apparent that variations and modifications may be made therein, and it is therefore intended in the following claims to cover each such variation and modification as falls within the true spirit and scope of the invention.

What is claimed is:

1. In a linear rolling bearing element comprised of a cage, a row of rollers arranged adjacent one another in said cage, and limiting projections formed on the ends of the cage and extending at right angles to the roll plane, a support movably positioned on the rollers and adapted to engage the limit projections, and a restoring spring mounted on the cage for centering the support with respect to the cage, the improvement wherein the cage is comprised of a relatively thick flat sheet metal strip and said limit projections are stamped out of the material of the strip, said cage further having roll pockets for receiving the rollers, the roll pockets at one side of the cage being shaped to fit the outer shape of the rollers, said strip having holding projections formed out of the material of the strip on the other side thereof for holding the rollers on said other side.

2. In a linear rolling bearing element comprised of a cage, a row of rollers arranged adjacent one another in said cage, and limiting projections formed on the ends of the cage and extending at right angles to the roll plane, a support movably positioned on the rollers and adapted to engage the limit projections, and a restoring spring mounted on the cage for centering the support with respect to the case, the improvement wherein the cage is comprised of a relatively thick flat sheet metal strip and said limit projections are stamped out of the material of the strip, and further comprising supporting slide projections directed toward the roll race on the side of the cage directed away from the support.

3. In a linear rolling bearing element comprised of a cage, a row of rollers arranged adjacent one another in said cage, and limiting projections formed on the ends of the cage and extending at right angles to the roll plane, a support movably positioned on the rollers and adapted to engage the limit projections, and a restoring spring mounted on the cage for centering the support with respect to the cage, the improvement wherein the cage is comprised of a relatively thick flat sheet metal strip and said limit projections are stamped out of the material of the strip, slits for receiving and holding said spring being provided on the limit projections.

4. In a linear rolling bearing element comprised of a cage, a row of adjacent rollers arranged one another in said cage, and limit projections formed at the ends of said cage in the rolling direction, said projections extending at right angles to the roll plane of a support element positioned to move on said rollers displaceably with respect to said projections, the improvement wherein said cage is comprised of a flat sheet metal strip with a thickness greater than half of diameter of said rollers, and said limit projections comprise rectangular material sections pressed out of the material of said cage at right angles to it upper surface, whereby the spacing between the sides of said projections toward said rollers and the next adjacent respective roller is less than half of said roller diameter.

5. The linear rolling element of claim 4, wherein the ends of the roller have reduced diameter pins, said reduced diameter pins being positioned in corresponding recesses in the sides of the cage and held by projections formed out of the material of the cage.

6. The linear rolling bearing element of claim 4 further comprising a spring arrangement on said projections for biasing said support element toward the center of the cage 1.

* * * * *

UNITED STATES PATENT AND TRADEMARK OFFICE
CERTIFICATE OF CORRECTION

PATENT NO. : 4,776,707

DATED : October 11, 1988

INVENTOR(S) : Armin Olschewski et al.

It is certified that error appears in the above-identified patent and that said Letters Patent is hereby corrected as shown below:

Col. 5, line 40, change "case" to --cage--.

Col. 6, line 17, after "arranged" insert --adjacent--.

Signed and Sealed this

Sixteenth Day of June, 1992

Attest:

DOUGLAS B. COMER

*Attesting Officer*  *Acting Commissioner of Patents and Trademarks*